United States Patent [19]
Steffen

[11] 3,921,159
[45] Nov. 18, 1975

[54] SEED PLANTER HERBICIDE AND INSECTICIDE MONITOR SYSTEM

[75] Inventor: David E. Steffen, Chatham, Ill.

[73] Assignee: Dickey-john Corporation, Auburn, Ill.

[22] Filed: Nov. 20, 1974

[21] Appl. No.: 525,582

[52] U.S. Cl.............. 340/267 R; 340/259; 340/271
[51] Int. Cl.² .......................................... G08B 19/00
[58] Field of Search......... 340/259, 267 R, 420, 271

[56] References Cited
UNITED STATES PATENTS 3,611,343  10/1971  Schoenbach ...................... 340/271
3,723,989   3/1973  Fathauer et al ..................... 250/215
3,739,367   6/1973  Fathauer .......................... 340/267 R Primary Examiner—Glen R. Swann, III
Attorney, Agent, or Firm—Olson, Trexler, Wolters, Bushnell & Fosse, Ltd.

[57] ABSTRACT

An output shaft of a herbicide and/or insecticide hopper is provided with a shaft rotation sensing device which produces control signals as the shaft rotates. Failure of the shaft to rotate will terminate dispensing of earth treatment material and will produce a control signal to interrupt the operation of a seed sensor thereby giving a visual indication on the seed planter monitor that a problem has occurred.

13 Claims, 5 Drawing Figures

SEED PLANTER HERBICIDE AND INSECTICIDE MONITOR SYSTEM

BACKGROUND OF THE INVENTION

This invention relates generally to a novel monitoring apparatus, and more particularly, to a monitoring apparatus for use in monitoring various operations of seed planting and treating equipment including the dispensing of seed and of earth treatment materials such as herbicides, insecticides and fertilizers. While certain features of this invention may be adapted for many different uses, the disclosure will be facilitated by directing it particularly to the problem of monitoring the dispensing of herbicides and insecticides simultaneously with dispensing of seeds during an automatic seed planting operation.

As is well known, a farmer engaged in mechanized planting of various seeds utilizes a planting machine pulled behind a tractor. Such planting machines usually include a plurality of separate planting devices arranged side by side to simultaneously plant a corresponding plurality of rows of crop. Some of the planting devices are provided with a separate hopper of seeds for each row being planted while other planting devices may have a common hopper containing seeds for a plurality of rows being planted. With this type of planting equipment a farmer often simultaneously treats the ground being planted by dispensing a material such as herbicide and/or insecticide as the seeds are being planted. This requires a separate hopper containing the herbicide and/or insecticide materials and which hopper are provided with a dispensing device operated by a rotating shaft. As the tractor pulls the seed planting apparatus and the earth treatment apparatus, a ground wheel beneath the apparatus rotates and drives a chain or other means for rotating the shaft of the earth treatment dispenser. By utilizing apparatus of this nature, a farmer can simultaneously plant and treat large fields of crop in a minimum of time.

However, during the operation of automated planting equipment a malfunction of the seed planting apparatus may occur in one or more of the seed dispensers thereby providing a deficiency or overage in plant population of a particular row of crops. To overcome this problem automatic electronic planter monitor equipment has been developed and is coupled to the seed dispensing apparatus. The planter monitor is mounted on the tractor in view of the operator and provides visual indicating means such as indicating lights or the like to indicate to the farmer that the seed dispensing equipment is operating properly.

However, because of the complex nature of automatic planting equipment, there may occur from time to time the need for monitoring the dispensing of earth treatment materials such as herbicides, insecticides and fertilizers, and the like, as well as monitoring the seed planting apparatus. However, to again duplicate monitoring circuitry for use with the earth treatment apparatus would greatly increase the cost of the automatic planting equipment.

SUMMARY OF THE INVENTION

Accordingly, it is an object of this invention to provide a new and improved monitor system for interconnection with automatic seed planting apparatus having seed dispensing means and a seed planter associated therewith and to utilize the circuitry of the seed planter monitor for also indicating a failure of operation of the ground treatment apparatus.

Another object of this invention is to provide a new and novel monitor circuit which is simple and efficient in operation while being relatively inexpensive and easy to manufacture.

Still another object of this invention is to provide a novel monitoring apparatus which is rugged and durable in construction so that it can be used in fields without clogging with dirt and dust.

Briefly, the planter herbicide and insecticide monitor system of this invention utilizes the existing seed planter monitor system associated with automatic planting apparatus. The herbicide and insecticide monitor utilizes a sensor to monitor shaft stoppage of the herbicide and/or insecticide applicator hoppers. The shaft stoppage may be caused by breakage or disconnection of drive means associated therewith. Such drive means may include a drive shaft secured to a ground wheel and a chain coupled between the drive shaft and shaft associated with the dispensor or applicator of the hoppers. The monitor of this invention is interconnected with the seed monitoring system so that when a malfunction occurs in the earth treatment apparatus it will give an indication that a malfunction has occurred in the seed planter. This will indicate to the operator of the tractor that something is wrong and he should inspect the seed planter as well as earth treatment apparatus.

Many other objects, features and advantages of this invention will be more fully realized and understood from the following detailed description when taken in conjunction with the accompanying drawings wherein the reference numerals throughout the various views of the drawings are intended to designate similar elements or components.

DETAILED DESCRIPTION OF THE ILLUSTRATED EMBODIMENT

Figure 1:
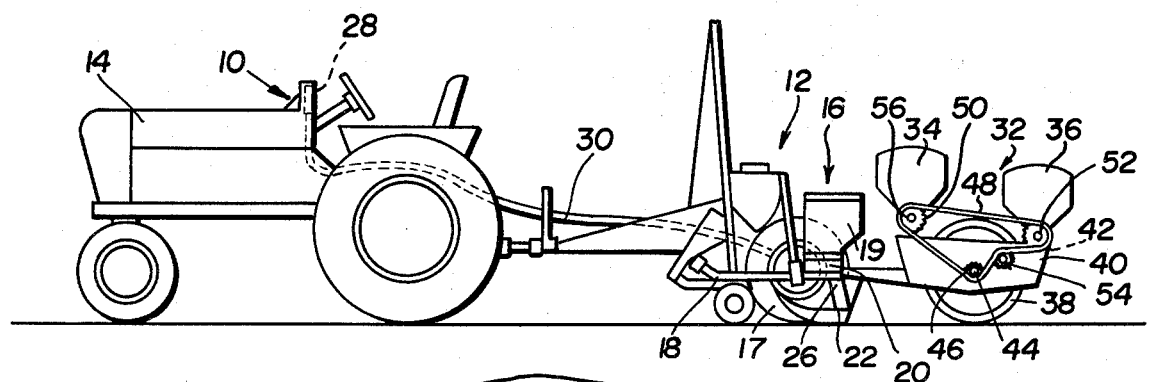
FIG. 1 is a side elevational view of an automatic seed planting apparatus and earth treatment dispensing means and illustrates means for monitoring the seed planting apparatus and earth treatment dispensing means.

Referring now to the drawings wherein like parts are designated with the same reference numerals throughout the figures, there is seen a monitoring apparatus designated generally by reference numeral 10. The monitoring apparatus 10 is adapted to be installed in a seed planter designated generally by reference numeral 12 which is pulled by a tractor 14. The planter 12 and tractor 14 may be of any suitable well known kind and need not be discribed in detail as the monitoring system of this invention can be incorporated in a plurality of different types of seed planting equipment. The seed planter monitor described in connection with the herbicide and insecticide dispensing monitor of this invention may be similar to that disclosed in Pat. No. 3,723,989 to Fathauer et al. and assigned to the same assignee of record. The planter 12 may include a plurality of planter units 16 positioned side by side and corresponding in number to the number of rows being simultaneously planted. The planter units 16 may be supported on a common frame 18, there being a separate seed containing hopper 19 for each planting unit. However, it will be understood that a common hopper may be associated with two or more of the planting units.

As is well known in the art, a ground wheel 17 rotates by frictional engagement with the ground and drives a chain or shaft member for rotating a dispensing disk of a feeding mechanism 20 within the seed planter. The seeds from the hopper pass through the feeding mechanism 20 which is located at the lower end of the hopper, and are delivered, one at a time, to the upper end of an associated seed dispensing chute 22. Associated with the seed dispensing chute 22 is a seed dispensing sensor unit 26 to be described in more detail herein below. The seed dispensing sensor 26 is electrically interconnected with a planter monitor unit 28 located on the tractor 14 by means of an interconnecting cable 30 which may be a multi-conductor cable. As the seed planting apparatus 12 is transported over the ground, a continuous visual read-out is provided on the seed planter monitor 28 to give the tractor operator an indication of operation of the seed planting equipment.

To further increase the efficiency of planting large crop fields, a ground treatment dispensing apparatus 32 is connected to the back end of the seed dispensing apparatus 16 and pulled simultaneously therewith. The earth treatment dispensing apparatus 32 here is shown having two hoppers 34 and 36 for containing various treatment materials such as insecticides and herbicides and the like. The hoppers 34 and 36 may contain the same kind of earth treatment material or each may contain a different kind of treatment material, as described.

A ground wheel 38 frictionally engages the ground over which the apparatus is transported and is used to drive various dispensing units associated with the hoppers 34 and 36. The ground wheel 38 has a central hub rotatably secured and mounted between a pair of side support plates 40 and 42. The ground wheel 38 also has an axle 44 having an output stub shaft portion thereof extending through the plate 40. A drive sprocket 46 is secured to the stub shaft portion of the axle 44 and engages a drive chain 48. The drive chain 48 is wrapped about a pair of sprockets 50 and 52 associated with the hoppers 34 and 36, respectively. To maintain the proper drive chain tension, an idler sprocket 54 is provided, the idler sprocket preferably being adjustable.

Each of the drive sprockets 50 and 52 are secured to shafts which extend through the bottom portion of their associated hoppers 34 and 36, respectively, to operate dispensing mechanisms therein. The dispensing mechanism may be an elongated solid paddlewheel or a toothed paddlewheel as is well known in the art.

Figure 2:
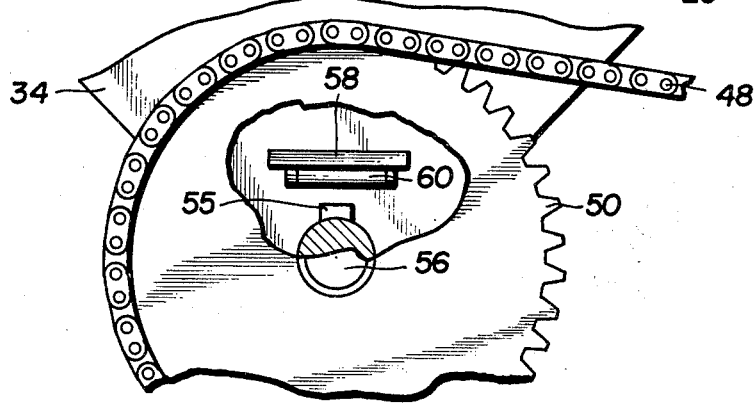
FIG. 2 is a fragmentary view of a drive gear and shaft associated with one of the earth treatment dispensing means of FIG. 1 for monitoring the rotation of the shaft associated therewith.

In accordance with this invention, one or both of the drive shafts secured to the sprockets 50 and 52 may include a shaft stoppage sensing mechanism. In the illustrated embodiment, as seen in FIG. 2, the shaft stoppage sensing mechanism includes a magnet 55 secured to and rotatable with a shaft 56 associated with the sprocket 50. A support 58 is positioned adjacent the rotating magnet 55 and shaft 56 and includes a reed switch element 60. The reed switch element 60 is actuated in response to the presence and absence of a magnetic field. Therefore, as the magnet 55 rotates with the shaft 56, reed switch 60 is periodically opened and closed in response thereto. While the rotating permanent magnet 55 and reed switch 60 are illustrated herein to provide sensing means for sensing the stoppage of rotation of the shaft 56, it will be understood that other suitable sensing means may be utilized. The shaft sensing means must have means for producing a first signal condition when the shaft is rotating and dispensing earth treatment material and for producing a second signal condition when the shaft fails to rotate thereby failing to dispense earth treatment material. Therefore should the drive chain 48 break or otherwise become disconnected from the sprockets 48, 50, 52 or 54, the shaft stoppage sensing switch 60 will no longer produce output pulses as a result of opening and closing of the contacts thereof.

Figure 3:
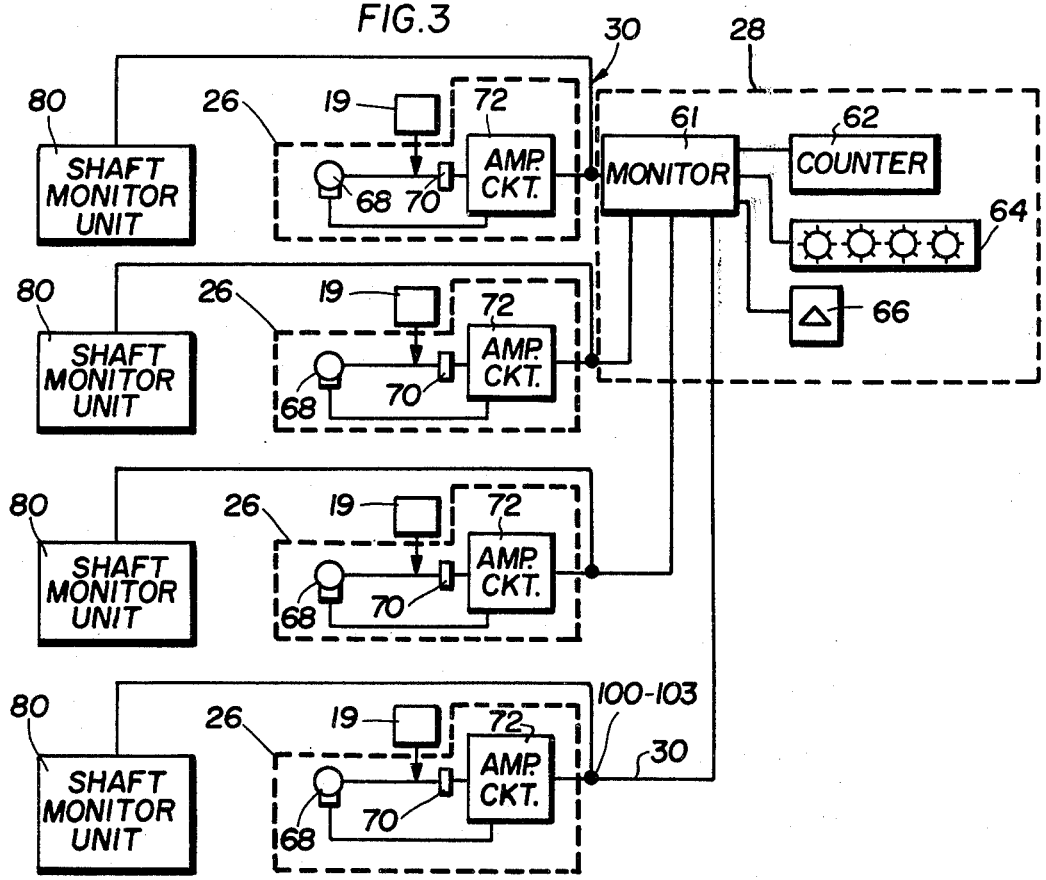
FIG. 3 is a block diagram of the overall monitoring apparatus of this invention for monitoring both the seed dispensing equipment and the earth treatment dispensing equipment.

For a better understanding of the seed monitoring apparatus 10 wherein the ground treatment monitoring apparatus is utilized, reference is now made to FIG. 3. As stated above, the seed monitoring apparatus 10 includes a detecting device 26 for each row of seeds being planted. In the example shown in FIG. 3, there are four seed dispensing detectors illustrated, it being understood that more or less may be utilized if desired. The monitoring system is illustrated in block diagram form and includes the control panel 28 which is mounted on the tractor 14, as best seen in FIG. 1. The control panel 28 includes a monitor circuit 61 which is fully disclosed and described in Pat. No. 3,723,989 and incorporated herein by reference. However, it will be understood that other monitor circuits may be used without departing from the novel concepts of this invention. The output of the monitor circuit 61 is connected to a counter 62 for giving count information as to the actual number of seeds being planted, this either being accomplished on a row by row basis or through a summer circuit to give a total indication of the number of seeds being planted from all four rows simultaneously. The monitor circuit 61 is also connected to a plurality of indicating lamps designated generally by reference numeral 64. The indicating lamps 64 may be maintained in a de-energized state when the seed planting apparatus is operating as normal and in an energized state when one or more of the seed planting units malfunctions, the number or position of the light corresponding to the number or position of the particular seed planting unit malfunction. The monitor circuit 61 is also connected to an audible indicating alarm unit 66 to provide means for further attracting the attention of the tractor operator to the energization of the indicating lamps 64.

The plurality of indicating devices 26 each include a light source 68 to operate photo-responsive means 70 associated 3herewith. 0the output of the photo-responsive means is coupled to an amplifier circuit 72 for amplifying the signal and delivering it to the monitor circuit of the monitor console 28. As a seed from the hopper 19, indicated diagrammatically in FIG. 3, passes from the hopper through the dispensing chute, it produces an output signal within the photo-responsive means 70 by either interrupting or causing reflected light rays to impinge thereupon.

In accordance with the principles of this invention, an earth treatment monitor unit 80 is associated with each one of the seed sensing units 26. The monitor units 80 are connected to the line between the console 28 and the seed sensing units 26 by means of an interconnecting harness or cable designated generally by reference numeral 30, this cable being illustrated in more detail in FIG. 4. By interconnecting the earth treatment monitor unit between the seed sensor and the seed planter monitor, a saving of components and cost is achieved while providing a highly reliable system.

Figure 4:
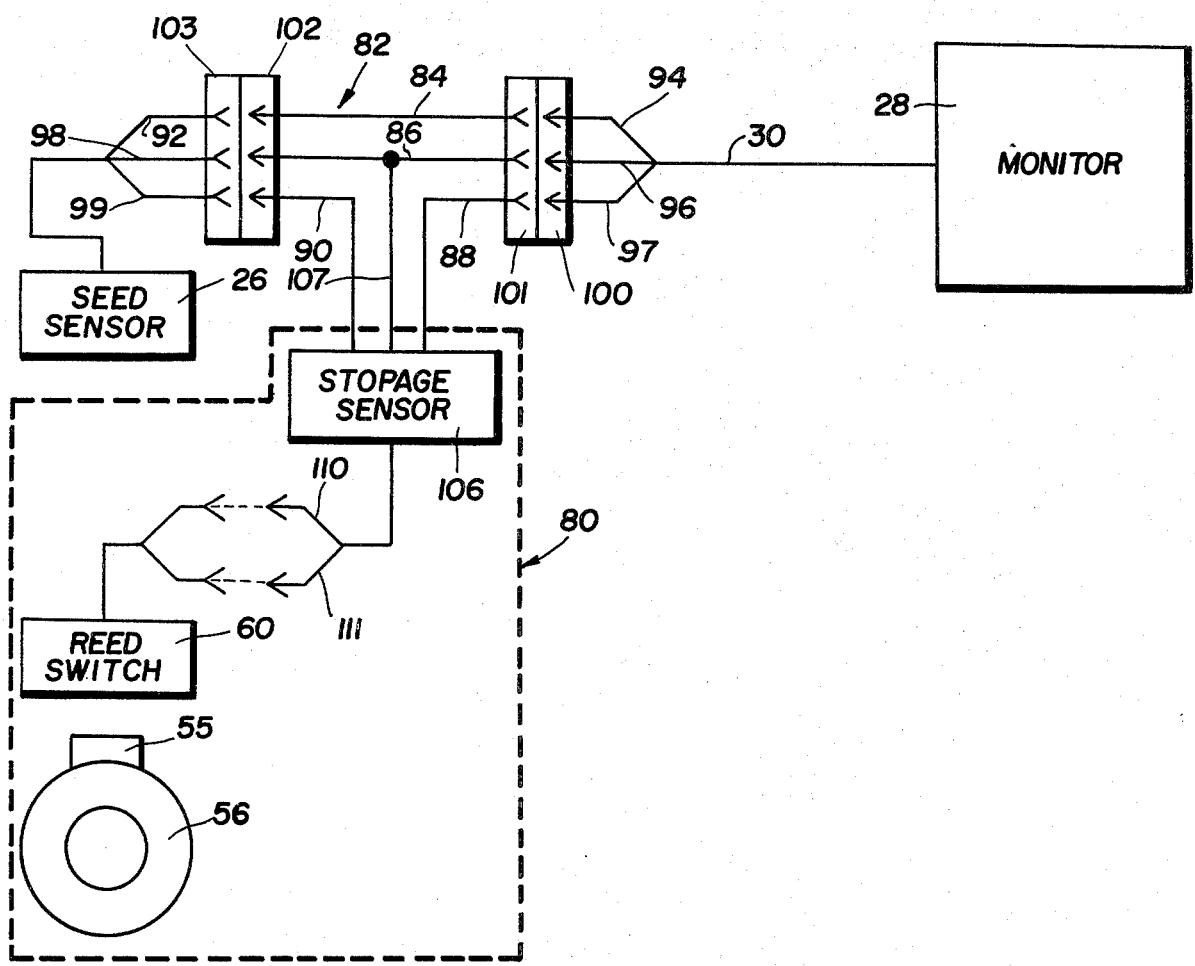
FIG. 4 is a detail of the interconnection of the wire harness between the seed sensing means and the seed planter monitor for coupling the earth treatment monitoring unit thereto.

Referring now to FIG. 4 there is seen the details of construction of the interconnecting cable 30 arrangement utilized for connecting the earth treatment monitoring units 80 between the seed sensors 26 and monitor 28. Here the interconnecting cable 82 is provided with a plurality of electrical leads 84, 86, 88 and 90. Electrical lead 84 is an interconnection between the output signal means of the seed sensor 26 to the seed planter monitor 28. Line 84 therefore is connected between a line 92 from the seed sensor 26 and a line 94 going to the seed planter monitor 28. This may be a control signal line. Operating power from the seed planter monitor 28 is delivered to the seed sensor 26 over a pair of power lines 96 and 97. Power is delivered over lines 98 and 99, respectively, to provide operating potential to the seed sensor unit 26.

Lines 94, 96 and 97 are associated with a plug 100 which, in turn, cooperates with a mating plug 101. The interconnecting cable 82 also includes a plug 102 to cooperate with a plug 103 associated with the seed sensor 26. Therefore the earth treatment monitoring unit 80 is readily adapted for a plug-in connection to existing monitoring equipment. A sensing circuit designated generally by reference numeral 106 receives lines 88 and 90 as well as a line 107 connected to the line 86. The sensing circuit 106 provides switching means associated therewith for opening and closing the connection between lines 88 and 90 thereby abling and disabling operation of the seed sensor 26. Therefore, if there is a malfunction of the earth treatment apparatus, it will produce an indication of a malfunction of the seed sensor to attract the attention of the tractor operator. The sensing circuit 106 senses the stoppage of rotation of the shaft 56, 1s mentioned 1bove with 9egard to FIG. 2. Reed switch 60 is coupled to the sensing circuit 106 over a pair of lines 110 and 111 to operate the switch means associated therewith.

Figure 5:
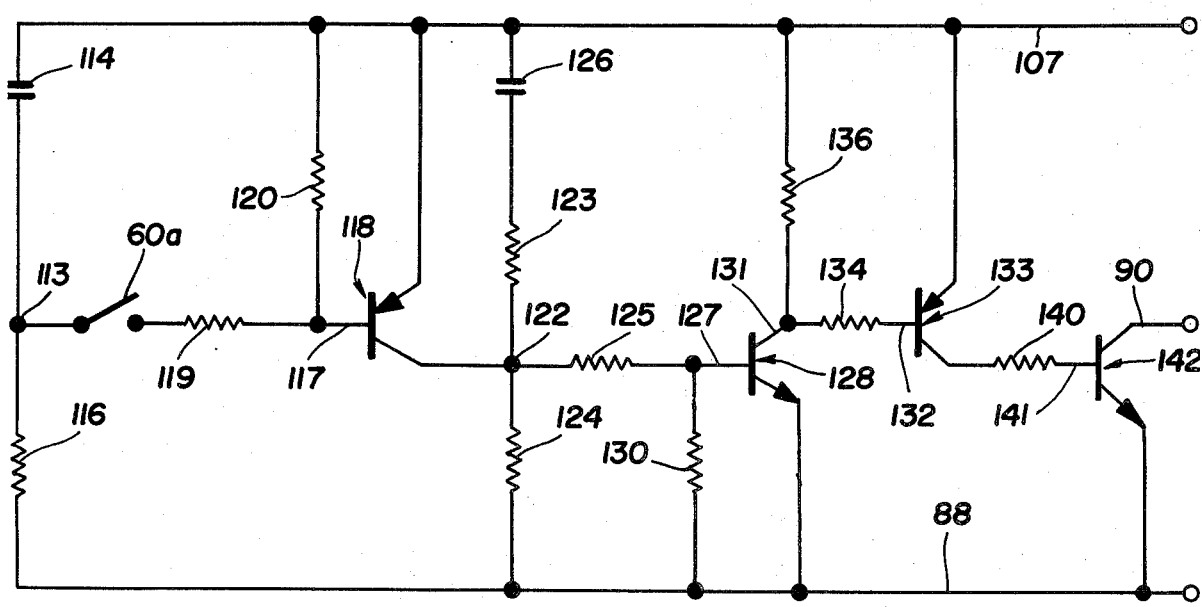
FIG. 5 is a detailed schematic diagram of the circuit of the earth treatment monitor unit of this invention.

For a better understanding of the particular circuit arrangement utilized in the sensing circuit 106 reference is now made to FIG. 5. The reed switch 60 is here designated generally by reference numeral 60a and has one end thereof coupled to a circuit point 113 between a capacitor 114 and a resistor 116. Capacitor 114 and resistor 116 provide an RC timing circuit. The other end of reed switch 60a is coupled to the base electrode 117 of a transistor 118 through a current-limiting resistor 119. Also coupled to the base electrode 117 is a biasing resistor 120. Transistor 118 has the collector electrode thereof coupled to a circuit point 122 which forms a juncture for a plurality of resistors 123, 124 and 125. Resistors 123 and 124 are connected in series with capacitor 126. Capacitor 126 is charged through resistors 123, 124 and 125 to provide a second timing circuit. Resistor 125 has one end thereof connected to a base electrode 127 of a transistor 128. Also connected to the base electrode 127 is a biasing resistor 130. A collector electrode 131 of transistor 128 is coupled to a base electrode 132 of a transistor 133, this coupling being through a resistor 134. Also connected to the collector electrode of transistor 128 is a resistor 136. Transistor 133 has its collector electrode coupled through a resistor 140 to a base electrode 141 of a switching transistor 142. Switching transistor 142 provides the switch means for connecting and disconnecting lines 88 and 90 for applying and removing operating power to the seed sensor 26, as best seen in FIG. 4. When the switching transistor 142 is conductive, operating power is applied to the seed sensor 26 and the seed planter monitor 28 will provide a normal reading. On the other hand, when the switching transistor 142 is non-conductive, the seed sensor 26 is disabled and the seed planter monitor 28 will indicate that something is malfunctioning.

Operation power for the sensing circuit 106 is applied through the lines 107 and 88. When the reed switch 60a is in the open circuit condition, capacitor 114 charges through resistor 116. This is a first RC time constant charging circuit. Also, the voltage across capacitor 126 increases exponentially in accordance with a time constant obtained by the capacitance of capacitor 126 and the resistance of resistors 123, 124 and 125. This is a second RC time constant charging circuit.

When reed switch 60a closes, the current charge on capacitor 114 passes through resistor 119 to the base emitter junction of transistor 118. This causes transistor 118 to turn on and discharge capacitor 126 through the current-limiting resistor 123. Capacitor 125 will again start to charge when transistor 118 is rendered non-conductive. After a majority of the current is drained from capacitor 114 transistor 118 is rendered non-conductive. The value of resistor 116 is sufficiently large so that when reed switch 60a is closed the base electrode of transistor 118 is not biased to a conductive state. Therefore, when transistor 118 is turned off by the discharge of capacitor 114, capacitor 126 will again start to charge.

If the reed switch 60a does not close during a subsequent time constant of capacitor 114 and resistor 116, the charge on capacitor 126 will ultimately reach that of the voltage across lines 88 and 107 thereby turning off transistor 128 which, in turn, will turn off transistor 133. Transistor 133 being rendered non-conductive will also render switching transistor 142 non-conductive and effectively open the power applying circuit between lines 97 and 99 thereby disconnecting the monitor 28 from the seed sensor 26. This will cause the monitor to provide an indication that a malfunction has occurred with the seed sensor. This is then intended to interpret that a malfunction has in fact actually occurred in operation of the earth treating apparatus such as the inseticide and herbicide dispensers indicated by reference numerals 34 and 36 of FIG. 1.

One of the functions of the capacitor 114 and resistor 116 is to provide a capacitive coupling to the reed switch 60a so that if the reed switch remains in the closed circuit condition during the time when the shaft 56 stops, the circuit will still indicate that a stoppage has occurred. As long as reed switch 60a continues to open and close sequentially as a result of movement of the magnet 55 past the reed switch at a sufficient rate, capacitor 126 is prohibited from charging to a point where transistors 128, 133 and 142 are turned off. In the illustrated embodiment the minimum RPM that the shaft 56 must maintain is determined by the value of resistors 124, 125 and 130 together with the value of capacitor 126. For example, to obtain a minimum value of 11 RPM for the shaft 56, resistor 124 is selected to be 470 K ohms, resistor 125 is selected to have a value of $1k^2$ or 1M ohms and resistor 130 is selected to have a value of $1k^2$ or 1M ohms. It will be understood that these values may be changed to obtain different minimum RPM values for the shaft 56. While only a single shaft stoppage monitor circuit has been disclosed herein it will be understood that two, or more, monitor circuits may be connected in series to monitor two or more shafts. Therefore, both dispensers 34 and 36 may be provided with shaft monitors.

What has been described is a simple and efficient monitoring system for monitoring the operation of earth treatment apparatus, and which monitoring system can be interconnected with existing seed monitoring equipment presently used in seed planting apparatus. While only a single specific embodiment of the monitoring apparatus of this invention has been illustrated herein, it will be understood that suitable variations and modifications may be effected without departing from the spirit and scope of the novel concepts disclosed and claimed herein.

The invention is claimed as follows:

1. A monitor for interconnection with automatic seed planting apparatus having seed dispensing means, seed sensor, and a seed planter monitor interconnected with said seed sensor through a plurality of electrical leads for indicating a malfunction of the seed planting apparatus, and wherein said seed planting apparatus has earth treatment means associated therewith, said monitor comprising: connector means for connection to the plurality of leads between said seed sensor and said seed planter monitor, switch means coupled to said connector means for providing a first switching state during one instance and a second switching state during another instance, said switch means being interposed in one of the electrical leads of said plurality of electrical leads, sensing means for mounting on said earth treatment means, said sensing means including signal means for producing a first signal condition when said earth treatment means is dispensing material and for producing a second signal condition when said earth treatment means fails to dispense material, and circuit means coupled between said sensing means and said switch means for causing said switch means to be in said first switching state during said first signal condition and in said second switching state during said second signal condition, said switching means thereby interrupting the operation of said seed planter monitor when in said second switching state to give an indication that the earth treatment means has failed.

2. A monitor as set forth in claim 1 wherein said connector means includes a pair of plugs, one plug for plugging into a mating plug connected to said plurality of said electrical leads.

3. A monitor as set forth in claim 1 wherein said switch means includes a transistor having base, emitter and collector electrodes, said emitter and collector electrodes forming a switching junction therebetween for providing closed and open circuit conditions when said transistor is conductive and non-conductive, respectively.

4. A monitor as set forth in claim 3 wherein said circuit means includes a first timing circuit of a first time duration to maintain said transistor conductive for applying operating power to said seed sensor during a time interval less than said first time duration and to render said transistor non-conductive for removing operating power from said seed sensor at a time interval greater than said first time duration, and a second timing circuit of a second time duration which is less than said first time duration, said second timing circuit being coupled to said first timing circuit and responsive to said sensing means for recycling said first timing circuit while said earth treatment means is dispensing material thereby restarting said first timing circuit at time intervals less than said first time duration, whereby said transistor is maintained in the conductive state for applying operating power to said seed sensor.

5. A monitor as set forth in claim 1 wherein said sensing means includes a shaft rotation sensing element for connection to a rotating shaft of said earth treatment means, whereby termination of rotation of said shaft of said earth treatment means will cause said sensing means to produce said second signal condition.

6. A monitor as set forth in claim 5 wherein said shaft rotation sensing element includes a reed switch mounted in proximity to said shaft, and magnet means secured to said shaft for rotation therewith to actuate said reed switch as it passes in close proximity thereto during each revolution of said shaft.

7. An apparatus for seed planting and earth treatment comprising: seed dispensing means for directing seeds toward the ground, seed sensing means for sensing the movement of seeds as they are directed toward the ground, a seed planter monitor interconnected with said seed sensing means through a plurality of electrical leads, said seed planter monitor having means for indicating a malfunction of said seed dispensing means, earth treatment means positioned adjacent said seed dispensing means for dispensing a material over the ground simultaneously while said seed dispensing means is directing seed toward the ground, switch means coupled to said plurality of electrical leads for providing a first switching state during one instance to apply operating power to said seed sensing means and a second switching state during another instance to remove operating power from said seed sensing means, sensing means on said earth treatment means for producing a first signal condition when said earth treatment means is dispensing material and for producing a second signal condition when said earth treatment means fails to dispense material, and circuit means coupled between said sensing means and said switch means for causing said switch means to be in said first switching state during said first signal condition for applying operating power to said seed sensor and in said second switching state during said second signal condition for removing operating power from said seed sensor, thereby giving an indication in said seed planter monitor that a malfunction has occurred in said earth treatment means.

8. An apparatus as set forth in claim 7 wherein said switch means includes a transistor having base, emitter and collector electrodes, said emitter and collector electrodes forming a switching junction therebetween for providing closed and open circuit conditions when said transistor is conductive and non-conductive, respectively, said closed and open circuit conditions corresponding to said first and second switching states, respectively.

9. An apparatus as set forth in claim 8 wherein said circuit means includes a first timing circuit of a first time duration to maintain said transistor conductive for applying operating voltage to said seed sensor during a time interval less than said first time duration and to render said transistor non-conductive for removing operating voltage from said seed sensor at a time interval greater than said first time duration, and a second timing circuit of a second time duration which is less than said first time duration, said second timing circuit being coupled to said first timing circuit and responsive to said sensing means for recycling said first timing circuit while said earth treatment means is dispensing material thereby restarting said first timing circuit at time intervals less than said first time duration, whereby said transistor is maintained in the conductive state for applying operating power to said seed sensor.

10. An apparatus as set forth in claim 7 wherein said sensing means includes a shaft rotation sensing element for connection to a rotating shaft of said earth treatment means, whereby termination of rotation of said shaft of said earth treatment means will cause said sensing means to produce said second signal condition and interrupt operating power applied to said seed sensor thereby giving an indication of a malfunction in said apparatus.

11. An apparatus as set forth in claim 10 wherein said shaft rotation sensing element includes a reed switch mounted in proximity to said shaft, and magnet means secured to said shaft for rotation therewith to actuate said reed switch as it passes in close proximity thereto during each revolution of said shaft.

12. A monitor for use with apparatus including a planter for planting seeds and a dispenser for dispensing material such as fertilizer, herbicide, insecticide and the like, comprising, first signal means responsive to a function of the seed planter for producing a first signal in accordance with seeds being planted, second signal means responsive to a function of the dispenser for producing a second signal in accordance with material being dispensed, indicating means responsive to said first signal, means electrically connecting said first signal means to said indicating means, and interrupting means electrically connecting said second signal means to said first signal means for interrupting said first signal therefrom to said indicating means, said indicating means being actuated in response to said first signal means and interruption thereof from said second signal means.

13. A monitor for use with apparatus including a planter for planting seeds and a dispenser for dispensing materials such as fertilizer, herbicide, insecticide and the like, as set forth in claim 12 wherein said interrupting means includes switch means connected in circuit with said first signal means for interrupting operation thereof, thereby giving an indication of a malfunction of said dispenser in said indicating means.

* * * * *